Dec. 27, 1949 W. A. ANDERSON 2,492,779
SERVO CONTROLLER
Filed March 26, 1946 2 Sheets-Sheet 1
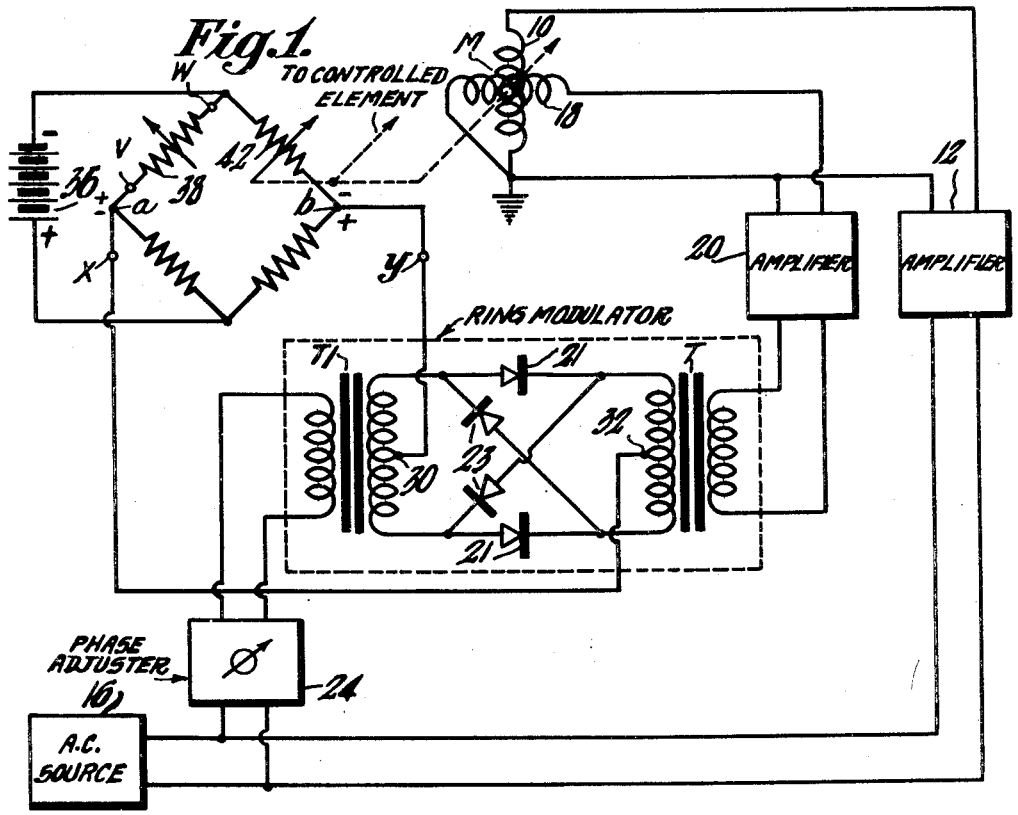
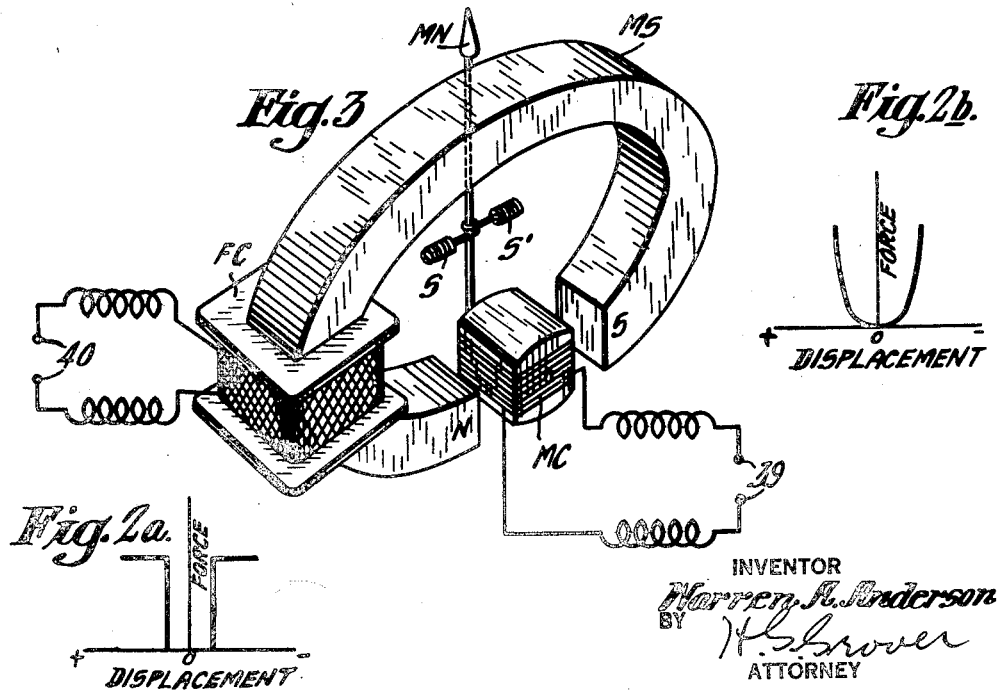
INVENTOR
Warren A. Anderson
BY
ATTORNEY

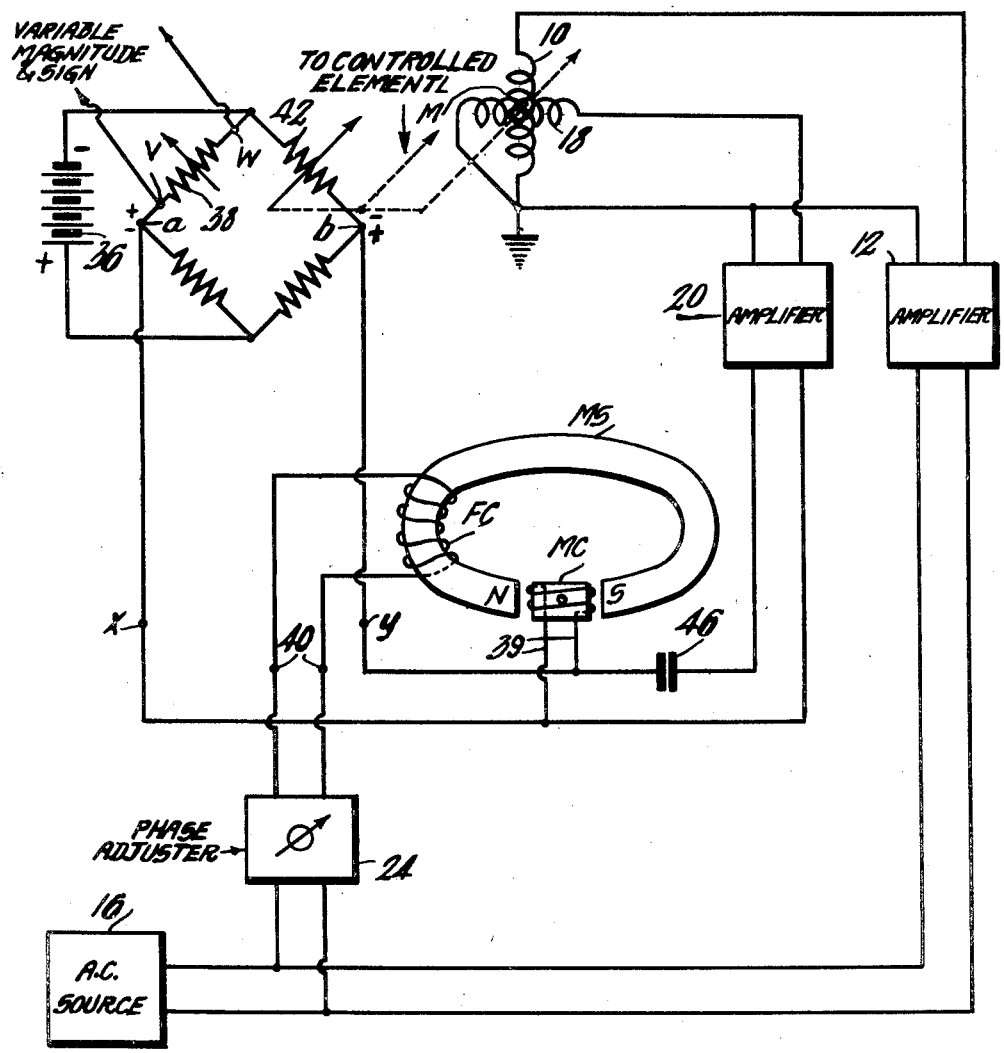
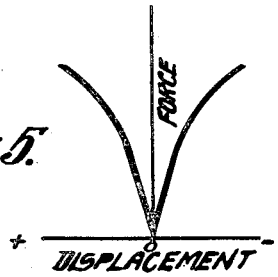

Patented Dec. 27, 1949

2,492,779

UNITED STATES PATENT OFFICE 2,492,779

SERVO CONTROLLER

Warren A. Anderson, New Dorp, N. Y., assignor to Radio Corporation of America, a corporation of Delaware Application March 26, 1946, Serial No. 657,161

1 Claim. (Cl. 318—29)

This application relates to automatic control means of wide use in the radio art. The present invention makes use of a novel device which is a combination magnitude and direction of current flow indicator, and rotatable transformer. In essence this device is a zero center meter of the D'Arsonval type with a field coil added. The latter is included to modulate the field flux of the meter, thus inducing voltages in the moving coil when it is displaced from its normal position.

In the field of automatic control, transient feedback or servo action is used to maintain a variable quantity at a desired or normal value. This normal value may be either a constant or an independently varying function. Should the variable depart from its normal value due to any outside cause the resulting transient is employed through servo action to make the system self-correcting.

Moreover, in electrical work the magnitude or polarity or both of a voltage is often the measure of a transient in a servo system. For example, often a servomotor is used to stabilize or control the mean frequency of an FM transmitter oscillator by returning the said oscillator if its means carrier frequency drifts. Then output of the oscillator is subjected to frequency discriminating and detection action to derive a variable control potential in the form of direct current which is of a sign or polarity depending upon whether the drift is up or down. This direct current is the variable referred to hereinbefore and may be used to cause a transient in a servomotor to control the direction of rotation of the said motor which may in turn change the reactance in the oscillator circuit to bring the mean frequency back to the proper point in the frequency spectrum and thereby reduce the variable control potential.

Heretofore the means controlled by the direct current potential might comprise a relay with two contacts in a motor circuit or it might act through a ring modulator to permit the same to pass alternating current of one phase or the opposite phase to one winding of the servomotor to control its direction of rotation and sense of tuning in the proper direction to recenter the oscillator frequency at its assigned mean frequency. Obviously the oscillator may also be one used in heterodyne receivers and then its frequency is controlled to recenter the intermediate frequency.

Temperature variations may likewise be translated into energy changes which in a similar manner react through a servo system to regulate the tempertaure wherein the change took place.

The servomotor may also respond to a transient to synchronize a multiplex telegraphy receiver distributor with the transmitted signal. In this instance pulse energy the polarity of which reverses as the transmitter distributor falls behind or ahead of the distributor at the receiver, is the variable. For example, the present invention may be used to replace the relay 36 of Fig. 1 of Kahn et al. U. S. Patent #2,359,649, dated October 3, 1944; or the relay 21 of Fig. 1 of my U. S. Patent #2,309,622, dated February 2, 1943.

An object of this disclosure is to provide a simple and practical means of employing a voltage or current change to produce a rapid, smooth and accurate control of the servomotor as a consequence of the controlled variable under consideration.

A further object of the present invention is to provide improved means as outlined in the preceding paragraph wherein smooth and accurate control of servo systems is obtainable in the region of small displacements of the control voltage.

In describing my invention in detail reference will be made to the attached drawings wherein—

Fig. 1 illustrates a servomotor and control means therefor, a portion at least of which might be found in the prior art. This figure is used to illustrate the need of my invention.

Figs. 2a and 2b illustrate why control means known in the art are unable to control servomotors smoothly and accurately for small or large changes in either direction of the control voltage.

Fig. 3 illustrates a mechanical device comprising a moving coil and permanent magnet arrangement such as used in meter structure modified in accordance with my invention to provide the smooth, accurate control for the servomotor; while Fig. 4 illustrates a servomotor such as shown in Fig. 1 with control means arranged in accordance with my invention to smoothly, accurately and positively control the servomotor for small changes in either direction of the control potential; while Fig. 5 illustrates the manner in which simple, accurate control of the servomotor is obtained by the use of my invention.

In Fig. 1 of the drawings M represents a servomotor of a type well known in the prior art and comprising two windings 10 and 18 arranged so that if current is flowing in one winding, say 10, and no current is flowing in the other winding the motor is stationary. When current flows in the other winding 18 in one direction rotation of the motor is in one direction. If the last current is reversed in phase, rotation of the motor is in the other direction. The motor shaft may be connected to any element to be controlled, such as a tuning reactance, a resistance, a temperature control device or to a phase shifter as in Kahn et al. #2,359,649. The winding 10 may be connected to an amplifier 12 which is excited at its input by alternating current from the source 16. The other motor winding 18 may be connected to an amplifier 20 connected at its input to the secondary winding of a transformer T the primary winding of which is connected with the secondary winding of a transformer T1 in a ring modulator circuit. The primary winding of the transformer T1 is then connected to the source 16 through a phase adjusting circuit 24. The purpose of the phase adjuster 24 is to establish about a phase quadrature relation between the voltages in windings 10 and 18. The ring modulator includes two pairs of diodes 21 and 23 arranged in a well known manner in opposed polarity so that if the polarity at the point 30 is positive with respect to the polarity at the point 32, one pair of diodes become conductive and alternating current of one phase is set up in the transformer T, whereas if the potential at 30 is negative with respect to the potential at 32 the other pair of diodes become conductive and alternating current of opposed phase, i. e., 180° out-of-phase, is set up in the transformer T.

To simplify the disclosure I have shown a bridge circuit comprising four arms and cooperating with a source of potential 36 to supply a voltage the phase of which may be reversed and such as would be developed in the face of carrier drift or other change and used to control a servo system. The ratio of pairs of the bridge arms are equal when the bridge is balanced and all of the arms may be of substantially equal value when the bridge is balanced. The source of potential 36 is connected across one of the diagonals of the bridge, while the points 30 and 32 are connected across the other diagonal of the bridge. The arms of fixed value make up one of the pairs of arms mentioned above. When the bridge is balanced no difference in voltage appears at points 30 and 32. The modulator is balanced, and no current is transmitted from the source 16 through the phase shifter to the secondary winding of T and to the winding 18 of the motor. The motor is stationary.

Now assume that the resistive arm 38 is variable and has been made smaller to unbalance the bridge so that the potential at the points b and 30 is negative. One pair of rectifiers, say 21, become operative and current of a first phase is amplified in 20 and impressed on winding 18 so that the motor rotates in one direction. If the resistive arm 38 is made larger the potential at the points b and 30 becomes positive and diodes 23 are operative and current of opposite phase is fed to the secondary winding of transformer T, and to amplifier 20 and the winding 18, so that the motor operates in the opposite direction.

The potential across arm 38 at points v and w may then be the control potential described hereinbefore derived from a variable or transient and acting through the ring modulator to reduce the transient. The variable control potential may also be applied at points x and y and the bridge omitted. The motor as stated above may tune or control the position of the controlled element such as a reactance, a resistance, etc. On the other hand it may also, if desired, vary the arm 42 of the bridge and in a sense to reestablish a balanced condition in the bridge.

It has been the practice to use ring modulators as illustrated in Fig. 1, or relays to translate polarity changes such as appear across the points a and b into proper phase changes to cause the motor M to operate the controlled element and to restore the bridge to balance. Neither the relay such as shown in Kahn et al. U. S. Patent #2,359,649, nor the ring modulator of Fig. 1 is a sensitive and accurate device. The relay, since it is inherently a go—no-go type of instrument has a force versus displacement characteristic as shown in Fig. 2a. Note that until there has been a considerable displacement of the potentials at a and b the relay does not go into action. The ring modulator, because of the square law characteristics of the unilateral conductors, has a force versus displacement characteristic as shown in Fig. 2b. As can be seen by inspection of Figs. 2a and 2b both devices are insensitive to small variations from normal.

In my present invention I disclose a means for obtaining a desired phase shift (reversal) that has a more linear force versus displacement characteristic in the region of small changes in the variable or control potential. Fig. 3 illustrates my mechanical arrangement for producing the desired effect. In essence the assembly is a zero center meter of the D'Arsonval type with a permanent magnet structure MS having north and south poles, and a moving coil MC located in the field of the poles. The moving coil MC is spring biased by springs S and S' to be symmetrically located in the area between the poles in such a position that the lines of force are parallel to the turns of the moving coil. The meter hand MH is actuated by the moving coil. I add an additional field coil FC to this mechanical assembly. When the field coil FC is excited from an alternating current source modulation of the meter polarizing flux field is obtained. The addition of the field coil FC causes the meter to become a combination, magnitude and direction of current flow indicator, and rotatable transformer. In normal operation the deflection of the meter needle MN is the resultant of the magnitude of the force of attraction (between the electrically formed poles of the moving coil and the field magnet) and the counterforce of the return springs S, S'. Under ordinary conditions the displacement of the needle is made linear with respect to the current flow through the moving coil MC. When zero current is flowing through the moving coil the return springs hold the coil parallel to the flux passed by the permanent magnet pole pieces.

The flow of current through the moving coil causes a deflection or angular rotation with respect to the field flux. Since the latter is a constant, no voltage is introduced in the moving coil once it has come to rest. However, if the field flux is modulated, as by application of alternating current to the leads 40, there will be a voltage induced in the moving coil as soon as it is displaced from its position parallel to the field flux. The magnitude of the voltage induced in the moving coil MC is proportional to the sine of the angle that the said coil makes with respect to the field flux. The phase of the voltage appearing across the terminals 39 of the moving coil is determined by the direction of moving coil rotation. The phase reverses as the moving coil rotates from its parallel position in opposite directions.

The manner in which the mechanism of Fig. 3 is used to control the servomotor M has been illustrated in Fig. 4. The modified zero center meter replaces the ring modulator. The winding FC is connected by leads 40 to the phase shifter 24. The moving coil MC is connected by its leads 39 to the diagonals a and b of the bridge and to the input of the amplifier 20. A blocking condenser 46 is included in the latter connections. Now the input to the amplifier 20 has a force versus displacement characteristic such as shown in Fig. 5. Comparison of Fig. 5 and Fig. 2b will show the improvement obtained by my invention.

The control potential, which as stated above may represent frequency drift of an oscillator or non-synchronism of the distributors in a multiplex telegraphy system or changes in temperature, may be applied at the points $x$ and $y$, in which case the bridge may be removed since it is no longer needed. The control potential may of course be applied to the bridge arm 38, in which case the bridge will be a means of applying a control potential to the magnetic structure. Where the invention is applied to an arrangement as illustrated in Kahn et al. U. S. Patent #2,359,649, the improved mechanism of this invention will replace the relay 36, in which case the potential applied to the relay winding will be applied at the points $x$ or $y$, or to the bridge arm 38. The mechanism may also replace the relay 21 in Fig. 1 of my U. S. Patent #2,309,622.

What is claimed is:

In control apparatus, in combination, a normally balanced bridge having four arms and having a source of direct potential connected across one diagonal thereof, means for impressing control potentials of reversible polarity and variable magnitude on one arm of said bridge to unbalance the same and to provide corresponding direct control potentials across the other diagonal of said bridge, a magnetic structure including a movable coil in the gap between the pole pieces of a magnet, a source of alternating current, a motor having two windings, means coupling one of said windings to said source of alternating current, a winding on said magnet, a phase shifter coupling said source of alternating current to said last-named winding, connections including a direct potential blocking condenser coupling the input of an amplifier to said movable coil, means coupling the output of said amplifier to the other motor winding, means coupling said other diagonal of said bridge to said movable coil to apply said direct control potentials thereto, and means driven by said motor for rebalancing said bridge when it becomes unbalanced.

WARREN A. ANDERSON.

REFERENCES CITED

The following references are of record in the file of this patent:

UNITED STATES PATENTS

| Number | Name | Date |
| --- | --- | --- |
| 2,303,654 | Newton | Dec. 1, 1942 |
| 2,349,963 | Harrison | May 30, 1944 |
| 2,368,701 | Borden | Feb. 6, 1945 |
| 2,385,454 | Lehde | Sept. 25, 1945 |
| 2,409,970 | Agins | Oct. 22, 1946 |